United States Patent Office 2,857,433
Patented Oct. 21, 1958

2,857,433

AROMATIC KETONES AND PROCESS OF THEIR PRODUCTION

Herman A. Bruson, North Haven, Frederick W. Grant, New Haven, and Edward Bobko, Hartford, Conn., assignors to Olin Mathieson Chemical Corporation, New Haven, Conn., a corporation of Virginia No Drawing. Application June 20, 1956
Serial No. 592,494

5 Claims. (Cl. 260—590)

This invention relates to aromatic ketones, and has for its object the provision of certain new ketones and a process for producing them. The process of the invention comprises reacting a compound containing an aromatic nucleus having at least one free reactive position available for substitution, in the presence of anhydrous aluminum chloride, with a keto-tetrahydrofuran represented by the formula:

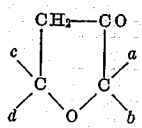

wherein $a$, $b$, $c$ and $d$ are alkyl groups. When the reaction is carried out using benzene as the aromatic nucleus, compounds (I) and (II) are produced in a reaction which may be explained as follows:

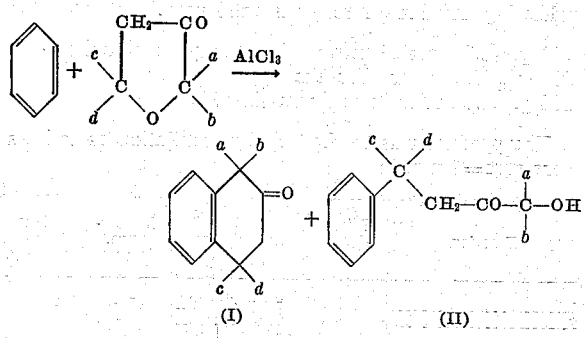

Groups $a$, $b$, $c$ and $d$ may be the same or different monovalent alkyl radicals such as methyl, ethyl, propyl, isopropyl, butyl, isobutyl, hexyl, octyl, dodecyl and higher.

In place of the benzene, one can use substituted benzenes such as halogenated benzenes exemplified by mono-, di-, or tri-halogenated benzenes in which the halogen is chlorine, fluorine, or bromine; alkyl-benzenes exemplified by toluene, the xylenes, and ethyl benzene; aryl benzenes, for example, diphenyl, phenanthrene or anthracene; cycloalkyl benzenes such as cyclohexyl benzene or decalin; alkoxybenzenes exemplified by methoxy- and ethoxy-benzene; aryloxybenzenes exemplified by diphenyl ether and naphthyl phenyl ether; and corresponding naphthalene derivatives.

For optimum yields of (I), it is advantageous to use from 1.5 to 2.0 moles of $AlCl_3$ per mole of the furanone employed. The reaction temperature can be varied, optimum yields being obtained within a range of 70°–100° C.

Best yields of (II) are obtained by using from 0.1 to 2.0 moles of $AlCl_3$ per mole of the furanone at temperatures from 30°–100° C., or 2.0–5.0 moles $AlCl_3$ per mole of furanone at temperatures of 0°–50° C.

In addition to compounds (I) and (II), there is also obtained a third ketone, whose infrared spectrum and other chemical properties suggest the structure (III).

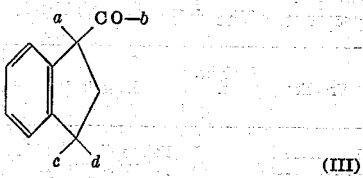

This ketone is obtained in about 50% of the theoretical yield when 2.5 moles of $AlCl_3$ are used per mole of the furanone employed, and the condensation is effected at 75–80° C.

In all cases it is advantageous to use an excess of the benzenoid component.

The reaction product of the tetrasubstituted furanone and the benzenoid compound in the presence of aluminum chloride is thus a mixture of at least three types of aromatic ketone. The mixed aromatic ketone product may advantageously be sulfonated by treatment with at least one mole equivalent of concentrated or fuming sulfuric acid at 10°–100° C., preferably at 50°–80° C., resulting in the introduction of one or more sulfonic groups in the aromatic substituent. On neutralizing the sulfonated aromatic ketones with sodium, potassium or ammonium hydroxide, water-soluble salts are obtained which produce an appreciable lowering of surface tension in aqueous solutions. These salts are valuable surface-active agents which find applications as useful emulsifiers, detergents and wetting agents. It will also be advantageous at times to isolate the individual aromatic ketones as indicated hereinafter prior to the sulfonation treatment.

The tetra-substituted tetralones prepared as described in Example I below are useful intermediates for the synthesis of compounds having utility in various fields of use, for example, pharmaceuticals, synthetic resins and plasticizers. Treatment with ammonia and hydrogen in the presence of nickel catalyst results in the conversion of the keto group in the tetra-substituted tetralone to an amino group, thus yielding a physiologically active product similar in structure to known blood pressure depressants. Oxidation of the substituted tetralones results in the production of a dibasic acid which yields useful linear polyesters with ethylene glycol and other polymethylene glycols. On reduction, the tetra-substituted tetralones are converted to secondary alcohols which, on esterification with monobasic or dibasic organic acids, particularly those containing six or more carbon atoms, yield esters which are useful as plasticizers for polyvinyl chloride and other vinyl polymers.

The following examples illustrate the process of this invention for the production of the new compounds:

EXAMPLE I 2,2,5,5 - tetramethyltetrahydrofuranone (142 g. or 1 mole) in 500 ml. dry benzene was placed in a one liter, 3-necked flask equipped with a stirrer, powder addition funnel, and reflux condenser. Fifteen ml. of solution was distilled off to insure dryness. Anhydrous aluminum chloride (226 g., 1.7 mole) was added in small portions to the stirred solution kept between 40° and 50° by external cooling. The solution was then heated at reflux (75–80°) for four hours. The cooled solution was poured into one liter of ice and water containing 100 ml. conc. hydrochloric acid. Ether (200 ml.) was added and the organic layer was separated. The aqueous layer was washed twice with 200 ml. portions of ether. The combined organic layers were washed with water, saturated aqueous sodium bicarbonate solution, and water, dried over sodium sulfate and evaporated to a dark syrup. This material was taken up in twice its volume of petroleum ether (B. P. 30–60°) and allowed to stand overnight at —15° C. to crystallize. Twenty-two grams of a light yellow crystalline product were obtained. The mother liquor was evaporated to a dark syrup and distilled through a ¾"×18' Vigreux column at <1 mm. pressure. The following fractions were collected.

| Fraction | Weight, g. | Description | Temp., degrees | Wgt. of 1,1,4,4-Tetramethyl-tetralone,[1] g. |
|---|---|---|---|---|
| 1 | 7 | light yellow liquid | 41–92 | |
| 2 | 46 | yellow syrup | 92–96 | 20.7 |
| 3 | 23 | orange-yellow syrup | 96–100 | 14.7 |
| Residue | 45 | black tar | | |

[1] Each fraction was taken up in twice its volume of petroleum ether (B. P. 30–60°) and allowed to stand overnight at —15° to crystallize.

The 57.4 g. recovery of 1,1,4,4-tetramethyltetralone M. P. 75° C. represents a 28% yield. Analysis: Calcd. for $C_{14}H_{18}O$=83.14% C., 8.95% H. Found: 83.0% C., 8.9% H.

Properties of 1,1,4,4-tetramethyltetralone:

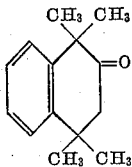

The compound consists of colorless crystals, M. P. 75°, having a sweet, camphoraceous odor. Upon reaction with hydrazine, it yields a crystalline hydrazone, M. P. 117–118°.

Upon reaction with hydroxylamine, it yields a crystalline oxime, M. P. 191–3°. This oxime upon treatment with hot polyphosphoric acid yields a crystalline lactam, M. P. 144–5°.

Upon reduction with lithium aluminum hydride, 1,1,4,4-tetramethyltetralol, M. P. 86–7°, is obtained.

Upon oxidation with alkaline permanganate solution, 1,1,4,4-tetramethyltetralone is converted to 2-hydroxy-1,1,3,3-tetramethylindan-2-carboxylic acid

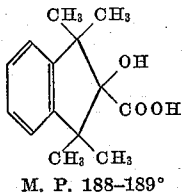

M. P. 188–189° by a benzoin-benzilic acid type of rearrangement. This product upon further oxidation with chromic acid yields 1,1,3,3-tetramethylindanone

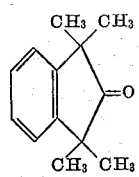

M. P. 75–77°

Upon oxidation with neutral permanganate solution, 1,1,4,4-tetramethyltetralone yields o-phenylene-bis-isobutyric acid:

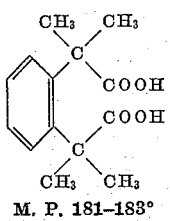

M. P. 181–183°

Upon dehydrogenation with palladium-charcoal, 1,1,4,4-tetramethyltetralone yields 1,2,3,4-tetramethylnaphthalene

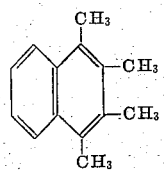

M. P. 105–106°

These products are of interest in the manufacture of pharmaceuticals and resins.

EXAMPLE II

A series of operations were carried out as described in Example I, with the exception that 1.5, 1.6, 1.8, 2.0 and 2.5 moles of aluminum chloride were used per mole of furanone. The data obtained are summarized in the following table:

| Moles AlCl₃ per Moles Furanone | Tetralone, percent | Yield Liquid Products, percent | Tar, percent |
|---|---|---|---|
| 1.5 | 12 | 18 | 26 |
| 1.6 | 21 | 18 | 23 |
| 1.7 | 28 | 20 | 22 |
| 1.8 | 26 | 32 | 22 |
| 2.0 | 12 | 62 | 16 |
| 2.5 | 1 | 59 | 11 |

EXAMPLE III

In testing the effect of using a larger amount of benzene in this condensation, an operation was carried out as described in Example II, with the exception that the following amounts of reagents were used.

100 g. (0.70 mole) tetramethyltetrahydrofuranone
600 ml. (6.8 moles) benzene
160 g. (1.2 moles) aluminum chloride The product was worked up by distillation as follows (pressure=1 mm.):

| Fraction | Weight, g. | Description | Temperature, degrees | Weight Solid Ketone, g. |
|---|---|---|---|---|
| 1 | 5 | orange liquid | 50–70 | |
| 2 | 46 | yellow syrup | 70–95 | 31 |
| 3 | 17 | orange syrup | 95–105 | 10 |
| Residue | 39 | black tar | | |

The solid ketone was obtained by the aforementioned process of diluting each fraction with twice its volume of petroleum ether (B. P. 30–60°) and allowing to stand at —15° C. to crystallize. The yield in this experiment was 29% of the theoretical.

EXAMPLE IV

Preparation of 2-hydroxy-2,5-dimethyl-5-phenylhexanone-3

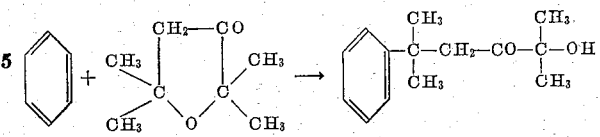

Aluminum chloride (114 g. or 0.86 mol) was added portion-wise at 30–40° to a solution of 40.5 g. (0.28 mole) of 2,2,5,5-tetramethyltetrahydrofuranone and 250 ml. dry benzene in a 3-necked flask equipped with a reflux condenser, stirrer, and powder addition funnel. Stirring was continued at 40° for twenty hours. The cooled reaction mixture was poured onto 1 liter of an ice and water mixture. Ether (100 ml.) was added, the layers separated, and the aqueous phase was washed several times with 100 ml. portions of ether. The combined organic layers were washed several times with 100 ml. portions of water, dried over sodium sulfate, and evaporated to 55 g. of a dark reddish syrup. A 4.7 g. aliquot of this material was chromatographed on alumina. The nonhydroxylic products were eluted with petroleum ether and benzene and 1.2 g. of hydroxy ketone was eluted with diethyl ether. This represents a 23% yield. The compound is a colorless liquid, $n_D^{25}$ 1.5073.

*Analysis.*—Calcd. for $C_{14}H_{20}O_2$=76.32% C; 9.15% H. Found in two analyses C 76.18% and 76.06%; H 9.46% and 8.94%.

When reacted with $AlCl_3$ in an inert solvent such as carbon disulfide, it yields the solid ketone 1,1,4,4-tetramethyltetralone described in Example I. Furthermore, upon oxidation with chromic acid, it yields β-phenylisovaleric acid, M. P. 56–57°

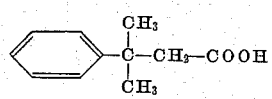

thus proving its structure as (II).

EXAMPLE V

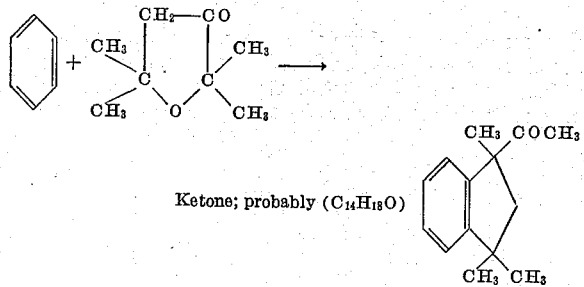

Ketone; probably ($C_{14}H_{18}O$)

Aluminum chloride (333 g. or 2.5 mols) was added portion-wise to a solution of 142 g. (1 mol) of 2,2,5,5-tetramethyltetrahydrofuranone in 500 ml. dry benzene in a 3-necked flask equipped with stirrer, condenser and powder addition funnel. The addition was carried out at a temperature of 40–50° after which the reactants were refluxed (75–80°) for four hours. The cooled reaction mixture was poured into about 1 liter of an ice and water mixture. Ether (100 ml.) was added, the layers separated, and the aqueous phase was washed several times with 100 ml. portions of ether. The combined organic layers were washed several times with 100 ml. portions of water, dried over sodium sulfate, and evaporated to a dark reddish syrup. Fractional distillation of this material resulted in 101 g. (50%) of a light yellow syrup. B. P. 96–105° at 1 mm. pressure.

Infrared analysis of this product has shown it to be an ortho-disubstituted aromatic ketone containing no olefinic unsaturation.

*Analysis.*—Calcd. for $C_{14}H_{18}O$=83.14% C; 8.95% H. Found: 82.35% C; 9.25% H.

Upon alkaline permanganate oxidation, it loses one carbon atom as $CO_2$ and yields a tertiary mono-carboxylic acid, $C_{13}H_{16}O_2$ having the probable structure:

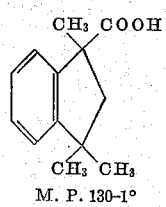

M. P. 130–1°

Upon reduction with lithium aluminum hydride, it yields a solid alcohol $C_{14}H_{20}O$ having a melting point 76–7°, having the probable structure:

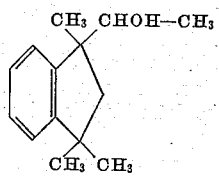

By replacing the benzene used in the foregoing examples with other benzene derivatives such as chlorbenzene, toluene, xylene, anisole, o-chlortoluene, diphenyl ether, naphthalene, tetralin and the like, isomeric ketonic mixtures of the corresponding homologues of compounds (I), (II) and (III) are obtained. These products are more difficult to separate in pure form than those made from benzene.

Several of these types are illustrated in the following examples:

EXAMPLE VI

A solution of 2,2,5,5-tetramethyltetrahydrofuranone (40 g., 0.28 mole) and p-xylene (212 g., 2 moles) was stirred at 10–15° for 1½ hours as 77 g. (0.58 mole) of aluminum chloride was added in portions. The red-brown reaction mixture was stirred at 20–30° for 5½ hours, left at room temperature overnight and then warmed (55–60°) for 1½ hours. The cooled solution was poured into cold hydrochloric acid. The organic layer was separated and combined with an ether extract of the aqueous layer. After washing with aqueous sodium carbonate and with water, this solution was dried over potassium carbonate and concentrated by evaporation of ether. The residue was distilled in vacuo and the following yellow liquid fractions were collected:

| Boiling Range | Weight, g. | $n_D^{25}$ |
|---|---|---|
| 79–82°/0.1 mm | 22 | 1.5231 |
| 82–88°/0.1 mm | 18 | 1.5283 |
| 88–96°/0.1 mm | 10 | 1.5361 |

Eight grams of a brown viscous oil remained as a still residue. The total weight of the three fractions, 64 g., represents a 78% yield of isomeric condensates of p-xylene and 2,2,5,5-tetramethyltetrahydrofuranone, all new ketones.

EXAMPLE VII

A solution of 2,2,5,5-tetramethyltetrahydrofuranone (40 g., 0.28 mole) and toluene (250 cc.) was stirred at 10–20° as 77 g. of aluminum chloride was added portion-wise. The resulting reaction mixture was stirred at 25–30° for six hours, left at room temperature overnight and then stirred at 75° for two hours. The cooled solution was slowly poured into cold aqueous hydrochloric acid. The organic layer was separated and combined with a toluene extract of the aqueous layer. After washing with aqueous sodium carbonate and with water, the toluene solution was dried over solid potassium carbonate and concentrated by distillation of the excess toluene at reduced pressure. The residue was vacuum distilled and the following fractions were collected:

| Boiling Range | Weight, g. | $n_D^{25}$ |
|---|---|---|
| 73–74°/0.1 mm | 1 | |
| 74–80°/0.1 mm | 38 | 1.5190 |
| 80–93°/0.1 mm | 12 | 1.5200 |
| Residue | 3 | |

The yield of crude product (two intermediate fractions) was 50 g. or 83% of the theoretical yield. A white crystalline oxime, M. P. 178–182°, was prepared from this product.

EXAMPLE VIII

Employing essentially the experimental procedure as described above, 160 g. (1.2 moles) of tetralin were reacted with 40 g. (0.28 mole) of 2,2,5,5-tetramethyl-tetrahydrofuranone in the presence of 77 g. (0.58 mole) of aluminum chloride. By vacuum distillation of the reaction product, the following fractions were collected:

| Fractions | Boiling Range | Weight, g. | $n_D^{25}$ |
|---|---|---|---|
| 1 | 50–110°/0.5 mm | 4 | |
| 2 | 110–137°/0.5 mm | 29 | 1.5479 |
| 3 | 137–150°/0.5 mm | 30 | 1.5462 |
| 4 | 165–200°/0.5 mm | 11 | |
| 5 | residue | about 25 | |

Fractions 2 and 3 were blue fluorescent viscous liquids. A white crystalline oxime, M. P. 177–178°, was prepared from fraction 2. Fraction 3 was redistilled and 19 g. of a blue fluorescent liquid, B. P. 134–138°/0.4 mm., $n_D^{25}$ 1.5426, were thus obtained.

EXAMPLE IX

*Reaction of 2,5-dimethyl-2,5-diethyltetrahydrofuranone with benzene*

Employing du Pont's procedure (Compt. rend., 152, 1486 (1910); 153, 275 (1911); Ann. Chim., 30, 536 (1913); C. A., 5, 3408), 2,5-dimethyl-2,5-diethyltetrahydrofuranone, B. P. 90–95°/25 mm., was prepared in 84% of the theoretical yield from 3,6-dimethyl-4-octyne-3,6-diol and aqueous mercuric sulfate. A solution of this ketone (75 g., 0.44 mole) and benzene (350 cc., 3.8 moles) was stirred at 10–20° as 113 g. (0.83 mole) of aluminum chloride was added. The resulting mixture was stirred at 20–30° for six hours, left standing at room temperature overnight and then refluxed for three hours. The cooled solution was poured into cold aqueous hydrochloric acid. The organic layer was separated, washed with aqueous sodium carbonate and water, dried over potassium carbonate and concentrated by evaporation of excess benzene at reduced pressure. By vacuum distillation of the residue, 85 g. of a yellow liquid, B. P. 92–106°/0.1 mm., $n_D^{25}$ 1.5070 were isolated, and found to have characteristic ketone properties.

EXAMPLE X 250 g. of anisole were reacted with 75 g. of 2,2,5,5-tetramethyltetrahydrofuranone in the presence of 150 g. of aluminum chloride under the conditions essentially as described for Example IX. The reaction mixture was subjected to vacuum distillation and 104 g. of a yellow liquid product were isolated, having a boiling point of 110°–135° C. at 0.1 mm. of mercury pressure, and displaying characteristic ketone properties.

All of the isolated reaction products described in the above examples are new aromatic ketones of the indicated structure, as confirmed by infra-red analysis, the formation of oximes and other characteristic ketone reactions.

We claim:

1. The process for preparing aromatic ketones which comprises reacting a compound containing an aromatic nucleus, having at least one free reactive nuclear position available for substitution, in the presence of anhydrous aluminum chloride with a keto-tetrahydrofuran having the formula

wherein *a*, *b*, *c* and *d* are alkyl groups.

2. A process of preparing aromatic ketones comprising reacting a compound containing an aromatic nucleus, having at least one reactive nuclear position available for substitution, with a tetraalkyl furanone in the presence of 0.1 to 5 moles of aluminum chloride per mole of the furanone.

3. A process of preparing aromatic ketones comprising reacting benzene with a tetraalkyl furanone in the presence of 1.5 to 2.0 moles of aluminum chloride per mole of the furanone at a temperature of about 70°–100° C.

4. The process for preparing aromatic ketones which comprises reacting a compound containing an aromatic nucleus having at least one free reactive position available for substitution with a keto-tetrahydrofuran having the formula

wherein *a*, *b*, *c* and *d* are alkyl groups, in the presence of aluminum chloride in an amount varying from 0.1 to 5 moles per mole of keto-tetrahydrofuran, producing a mixture of ketones represented by the formulas

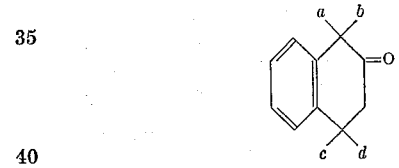

and

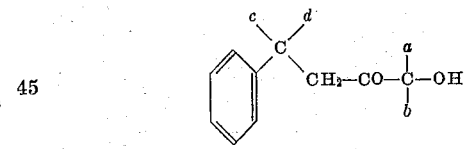

wherein *a*, *b*, *c* and *d* are alkyl groups.

5. The compound represented by the formula

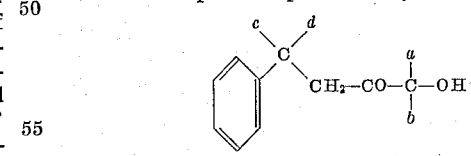

wherein *a*, *b*, *c* and *d* are alkyl groups.

References Cited in the file of this patent

Gilman et. al.: J. A. C. S., 56, 745 (1934).
Colonge et al.: Bull. Soc. Chim. de France (1947), 1002–5.
Colonge et al.: Bull. Soc. Chim. de France (1951), 857–62.
Dodson et al.: J. A. C. S., 73, 2767–9 (1951).